United States Patent [19]

Engel et al.

[11] Patent Number: 4,531,558
[45] Date of Patent: Jul. 30, 1985

[54] GASEOUS FUEL REFUELING APPARATUS

[75] Inventors: Larry J. Engel, Rochester; John W. Turko, River Rouge, both of Mich.

[73] Assignee: Michigan Consolidated Gas Co., Detroit, Mich.

[21] Appl. No.: 484,470

[22] Filed: Apr. 13, 1983

[51] Int. Cl.$^3$ .............................................. B65B 31/00
[52] U.S. Cl. ...................................... 141/44; 141/82; 48/190; 123/525
[58] Field of Search .................................. 141/1, 4–7, 141/11, 12, 37, 44, 67, 69, 71, 82, 85, 89; 137/110, 113, 118; 123/525; 48/190; 222/3, 6; 62/476, 473

[56] References Cited

U.S. PATENT DOCUMENTS

| | | | |
|---|---|---|---|
| 1,943,059 | 1/1934 | Dana | 141/82 X |
| 2,075,408 | 3/1937 | Sholes | 141/82 |
| 2,399,723 | 5/1946 | Crowther | 48/190 |
| 2,663,626 | 12/1953 | Spangler | 48/190 |
| 2,681,167 | 6/1954 | Weisz | 222/1 |
| 2,712,730 | 7/1955 | Spangler | 62/9 |
| 2,882,243 | 4/1959 | Milton | 423/329 |
| 3,021,689 | 2/1962 | Miller | 62/473 X |
| 3,688,755 | 9/1972 | Grayson et al. | 123/549 |
| 3,719,196 | 3/1973 | McJones | 137/110 |
| 3,807,422 | 4/1974 | McJones | 137/12 |
| 3,837,377 | 9/1974 | McJones | 141/4 |
| 3,844,306 | 10/1974 | Hill | 137/256 |
| 3,847,173 | 11/1974 | Hill | 137/110 |
| 3,850,009 | 11/1974 | Villadsen | 62/473 |
| 3,906,915 | 9/1975 | Bednarczyk et al. | 123/575 |
| 3,926,168 | 12/1975 | Csicsery | 123/180 R |
| 3,960,769 | 6/1976 | Munzner et al. | 502/417 |
| 4,010,623 | 3/1977 | Kaschak | 141/5 X |
| 4,016,836 | 4/1977 | MacKay et al. | 123/3 |
| 4,046,709 | 9/1977 | Yuki | 502/437 |
| 4,139,019 | 2/1979 | Bresie et al. | 48/190 |
| 4,187,882 | 12/1979 | Anderson et al. | 123/1 A |
| 4,225,320 | 9/1980 | Gell | 48/191 |
| 4,227,497 | 10/1980 | Mathieson | 123/525 |
| 4,253,428 | 3/1981 | Billings et al. | 123/1 A |
| 4,287,166 | 9/1981 | Dwyer | 423/325 |
| 4,341,234 | 7/1982 | Meinass et al. | 137/110 |
| 4,343,770 | 8/1982 | Simons | 422/112 |

OTHER PUBLICATIONS

"The Quest For Alternative Fuels" Detroit Engineer, Nov. 1983, pp. 6–9.
"Sorbent-Containing Storage Systems for Natural Gas Powered Vehicles", by Amos Golovoy, Ford Motor Company, Dearborn, Mich.
"Properties of Natural Zeolites"–U.S. Dept. of the Interior, RI 7744, Bureau of Mines Report of Investigations/1973.
"Natural Gas Storage with Zeolites", by Ronald A. Munson and Robert A. Clifton, Jr.–Bureau of Mines Nonmetallic Minerals Program, U.S. Dept. Interior, 8/71.
"Natural Zeolites: Their Properties, Occurrences, and Uses"–R. A. Munson and R. A. Sheppard, Mineral Science and Engineering–Jan. 1974.
"Low Pressure Methane Storage System for Vehicles— Preliminary Concept Evaluation"–J. Braslaw, J. Nasea, Jr. and A. Golovoy, Ford Motor Co., MI-1/82.
"Hydrogen as an Automotive Fuel": by Jim Epperson, Michigan Technic–Apr. 1974, (pp. 6–7).

(List continued on next page.)

Primary Examiner—Henry K. Artis
Assistant Examiner—Ernest G. Cusick
Attorney, Agent, or Firm—Harness, Dickey & Pierce

[57] ABSTRACT

An apparatus for supplying fuel to a gaseous fuel consuming device, such as a gaseous fueled vehicle or the like, generally includes one or more gas compressors for compressing the gaseous fuel to a predetermined pressure, preferably less than 500 psig (3450 kPa). The apparatus preferably also includes apparatus for cooling the compressed gaseous fuel at least to ambient temperatures. Sorbent filtering and storage means are also preferably provided for maximizing the amount of fuel to be stored in the apparatus in order to supply a quick initial charge of the gaseous fuel to the vehicle or other gaseous fuel consuming device.

23 Claims, 7 Drawing Figures

OTHER PUBLICATIONS

"Compressed Natural Gas (CNG): A Vechile Fuel For Utility Company Fleets-The Pros and Cons"-American Gas Association-Feb. 1982.

"Assessment of Methane-Related Fuels for Automotive Fleet Vehicles"-U.S. Dept. of Energy-Feb. 1982, pp. 2-1 through 2-41; 3-1 through 3-21; and 9-1 through 9-4, (vol. 2 of 3 volumes).

"Assessment of Methane-Related Fuels for Automotive Fleet Vehicles"-U.S. Dept. of Energy-Feb. 1982-vol. 1 of 3 volumes.

"Assessment of Methane-Related Fuels For Automotive Fleet Vehicles"-U.S. Dept. of Energy-Feb. 1982-pp. D1 through D6 (vol. 3 of 3 volumes).

"State-of-the-Art Assessment of Methane-Fueled Vehicles"-U.S. Dept. of Energy, Feb. 1982-DOE/-CE-0026.

"Adsorption of Methane on Active Carbons and Zeolites", by K. Otto, Ford Motor Company, Dearborn, Mich.

"Are Other Concepts Pushing Diesels Into Background at Ford?", by Al Wrigley-Automotive Diesel Progress, Aug. 1981.

S.A.E. Technical Papar 830382, "On-Board Storage and Home Refueling Options for Natural Gas Vehicles", by A. Golovoy and J. Braslaw, published and presented by S.A.E. International Congress & Exposition in Det., MI, 2/28-3/4/83.

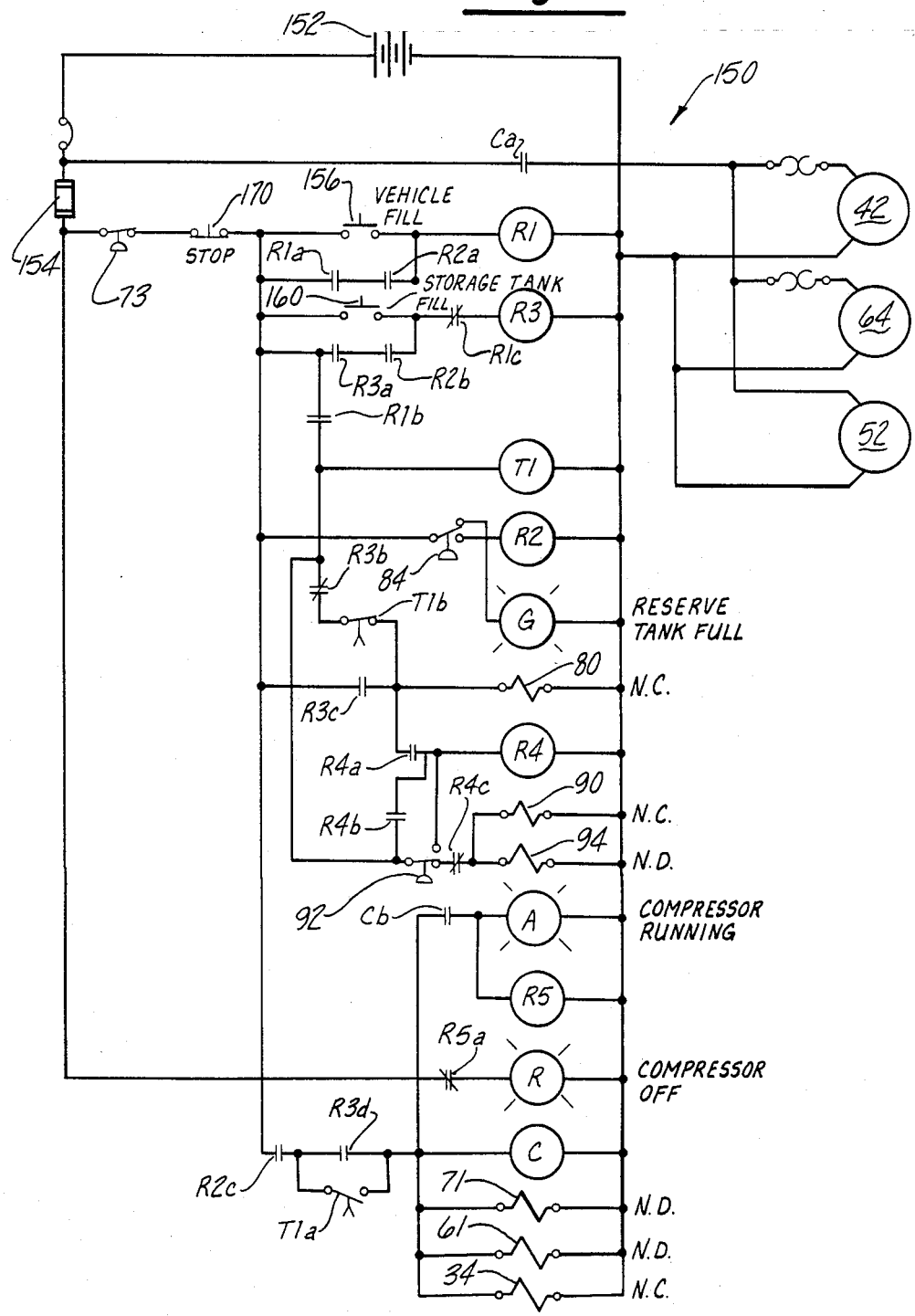

GASEOUS FUEL REFUELING APPARATUS

BACKGROUND AND SUMMARY OF THE INVENTION

The invention relates generally to refueling apparatus for transportation vehicles or other devices fueled by low pressure natural gas or other gaseous hydrocarbon fuels. More particularly, the invention relates to such refueling apparatus employing high-surface-area sorbent (adsorbent and/or absorbent) materials for filtering the gaseous fuel, for storing a quantity of the gaseous fuel, or both, and preferably employing hermetically-sealed gas compressor apparatus for pressurizing the gaseous fuel to a desired pressure.

Over the years, concerns have developed over the availability of conventional fuels (such as gasoline or diesel fuel) for internal combustion engine vehicles, the operating costs and fuel efficiencies of such vehicles, and the potentially adverse effects of vehicle emissions on the environment. Because of such concern, much emphasis has been placed on the development of alternative to such conventional vehicle fuels. One area of such emphasis has been the development of vehicles fueled by natural gas or other methane-type gaseous fuels, either as the sole fuel or as one fuel in a dual-fuel system. As a result, vehicles using such fuels have been produced and are currently in use on a relatively limited basis both domestically and abroad.

In order to provide such gaseous fueled vehicles with a reasonable range of travel between refuelings, it has previously been necessary to store the on-board gaseous fuel at very high pressures, generally in the range of approximately 2000 psig (13.9 MPa) to 3000 psig (20.7 MPa). Without such high-pressure on-board storage, the practical storage capacity of such vehicles was limited because of space and weight factors to the energy equivalent of approximately one to five gallons (3.7 to 19 liters) of conventional gasoline. Thus, by compressing the gaseous fuel to such high pressures, the on-board storage capacities of such vehicles were increased.

One disadvantage of the compressed gaseous fuel systems discussed above is that they require complex and comparatively expensive refueling apparatus in order to compress the fuel to such high pressures. Such refueling apparatus has therefore been found to effectively preclude refueling the vehicle from a user's residential natural gas supply system as being commercially impractical. Furthermore, such high pressure apparatus is frequently perceived by the public as being more dangerous than low pressure apparatus. For example, the public is already accustomed to refrigerant pressures in the area of approximately 200 psig (1380 KPa) in home refrigeration units and does not find such low pressures objectionable.

Another alternative to the above-discussed fuel storage and vehicle range problems, has been to store the on-board fuel in a liquid state generally at or near atmospheric pressure in order to allow sufficient quantities of fuel to be carried on board the vehicles to provide reasonable travel ranges between refuelings. Such liquified gas storage has also, however, been found to be disadvantageous because it requires inordinately complex and comparatively expensive cryogenic equipment, both on board the vehicle and in the refueling station, in order to establish and maintain the necessary low gas temperatures.

In non-vehicular gaseous fuel storage applications for stationary installations, it has been found that the use of high-surface-area adsorptive materials has provided for significantly increased storage capacities at relatively low pressures. Such adsorptive materials typically include zeolites, activated carbons, silica gels, and various clays, for example. For example, U.S. Pat. No. 2,712,730, issued to Spangler on July 12, 1955, discloses a method and apparatus for storing various types of (liquified) hydrocarbon gases which utilizes an adsorbent in order to increase the storage capacity of the stationary system. However, in spite of significant and extensive research and development efforts in the area of gaseous fuel powered vehicles, no natural gas fuel storage or refueling systems have emerged that apply sorbent storage technology to on-board vehicular storage and to their refueling apparatus. In fact, the above-discussed compressed natural gas and liquefied natural gas systems have been generally regarded as the only two feasible systems for natural gas powered vehicle applications.

The need has thus arisen for a gaseous fuel powered vehicle that is capable of storing reasonable quantities of on-board fuel storage at relatively low pressures, and for practical and comparatively inexpensive refueling apparatus allowing such a vehicle to be refueled by the user from a residential natural gas supply system.

In accordance with the present invention, an apparatus for supplying fuel to a gaseous fuel consuming device, such as a vehicle, a lawn mower, or a snow thrower, for example, is adapted to be connected in fluid communication with a source of gaseous fuel and generally includes means for compressing the fuel in order to increase its pressure to a predetermined value, cooling means for reducing the temperature of the compressed gaseous fuel, and discharge means adapted to be releasably connected to the gaseous fuel consuming device. Preferably, the gaseous fuel supply apparatus also includes sorbent filter means for substantially removing impurities and certain predetermined fuel constituents from the fuel, sorbent storage means for sorptively storing a quantity of the previously compressed gaseous fuel, and automatic control apparatus for allowing the compressed gaseous fuel to be supplied to the fuel consuming device through the discharge means either from the sorbent storage means or from the compressor means by bypassing the storage means, if such storage means is included. As referred to herein, the terms "sorbent" and "sorptive" are intended to refer to both adsorbing or absorbing, or both.

In the preferred embodiment, the pressure of the compressed gaseous fuel supplied to the fuel consuming device is generally in the range of approximately 200 psig to approximately 400 psig (1380 KPa). Furthermore, the compressor means preferably comprises one or more hermetically-sealed gas compressors for compressing gaseous fuel to such pressures, the compressors preferably being generally of the type of gas compressors commonly found in refrigeration equipment.

One of the primary objectives of the present invention is to provide a refueling apparatus that may be manufactured significantly less expensively than those of the prior art in a compact, modular form, and that is adapted to be connected to a user's residential natural gas or other gaseous fuel supply system. Another of the primary objectives of the present invention is to provide such an apparatus that can be conveniently, safely, and relatively inexpensively operated and used by the consumer.

A vehicle of the type referred to herein is disclosed and described in a patent application entitled GASEOUS HYDROCARBON FUEL STORAGE SYSTEM AND POWER PLANT FOR VEHICLES. Such vehicle and the exemplary refueling apparatus herein are also disclosed in a patent application entitled GASEOUS HYDROCARBON FUEL STORAGE SYSTEM AND POWER PLANT FOR VEHICLES AND ASSOCIATED REFUELING APPARATUS. Both of said applications, which are incorporated by reference herein, are assigned to the same assignee as the present application and are filed of even date.

Additional objectives, advantages and features of the present invention will become apparent from the following description and the appended claims, taken in conjunction with the accompanying drawings.

BRIEF DESCRIPTION OF THE DRAWINGS

FIG. 6 is a schematic diagram of the preferred electrical and control system for the refueling apparatus of FIG. 1.

DETAILED DESCRIPTION OF THE PREFERRED EMBODIMENTS

Figure 1:
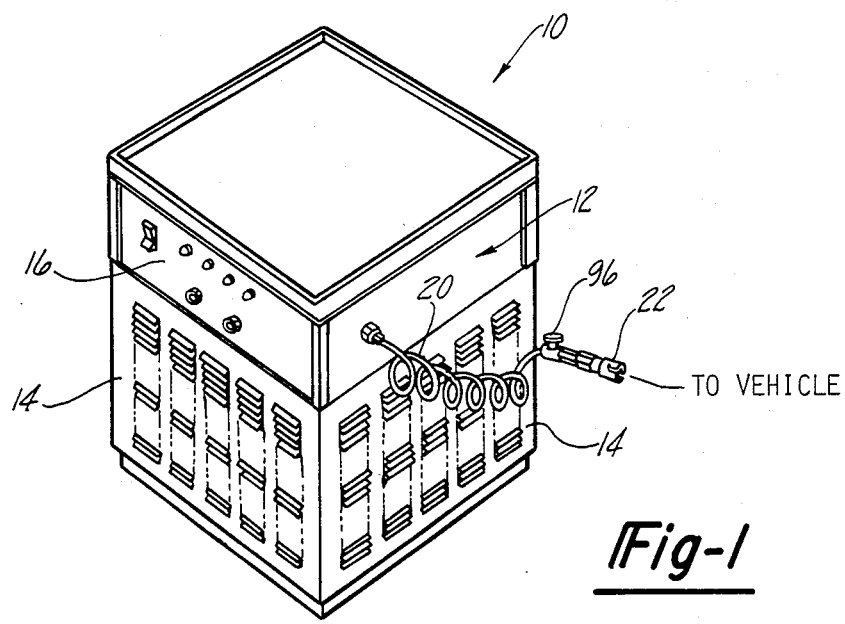
FIG. 1 is an overall perspective view of an exemplary gaseous fuel refueling apparatus according to the present invention.

FIGS. 1 through 6 depict exemplary embodiments, for purposes of illustration, of a refueling apparatus according to the present invention. One skilled in the art will readily recognize that the principles of the present invention are equally applicable to embodiments of gaseous fuel refueling systems other than the particular embodiments shown in the drawings.

Referring to FIG. 1, a refueling module or apparatus 10 is preferably enclosed by a housing 12, which includes louvered portions 14 to allow for the circulation of air therethrough and a control panel 16 thereon. It should be noted at the outset that although the control panel 16 is located on the housing 12 in the exemplary refueling apparatus, the invention also contemplates a remote control panel mounted separate from the refueling module, such as inside the user's home, for example. A flexible outlet conduit 20, with a suitable connector 22 at its free end, is adapted to be releasably connected to a vehicle or other gaseous fuel consuming device in order to discharge the gaseous fuel thereto. As will be discussed below in more detail, the exemplary refueling module 10 is preferably constructed to be housed in a small, unobtrusive module-type package and is designed to operate on ordinary residential electrical supply systems (e.g. 110-230 volt systems) in order to provide a convenient and easy-to-operate system for home refueling of a gaseous fuel powered vehicle or other device. One skilled in the art will readily recognize, however, that the principles of the present invention are equally applicable to larger versions of a refueling module, which are adapted for commercial use and which are capable of simultaneous multi-vehicle refueling, for example.

Figure 2:
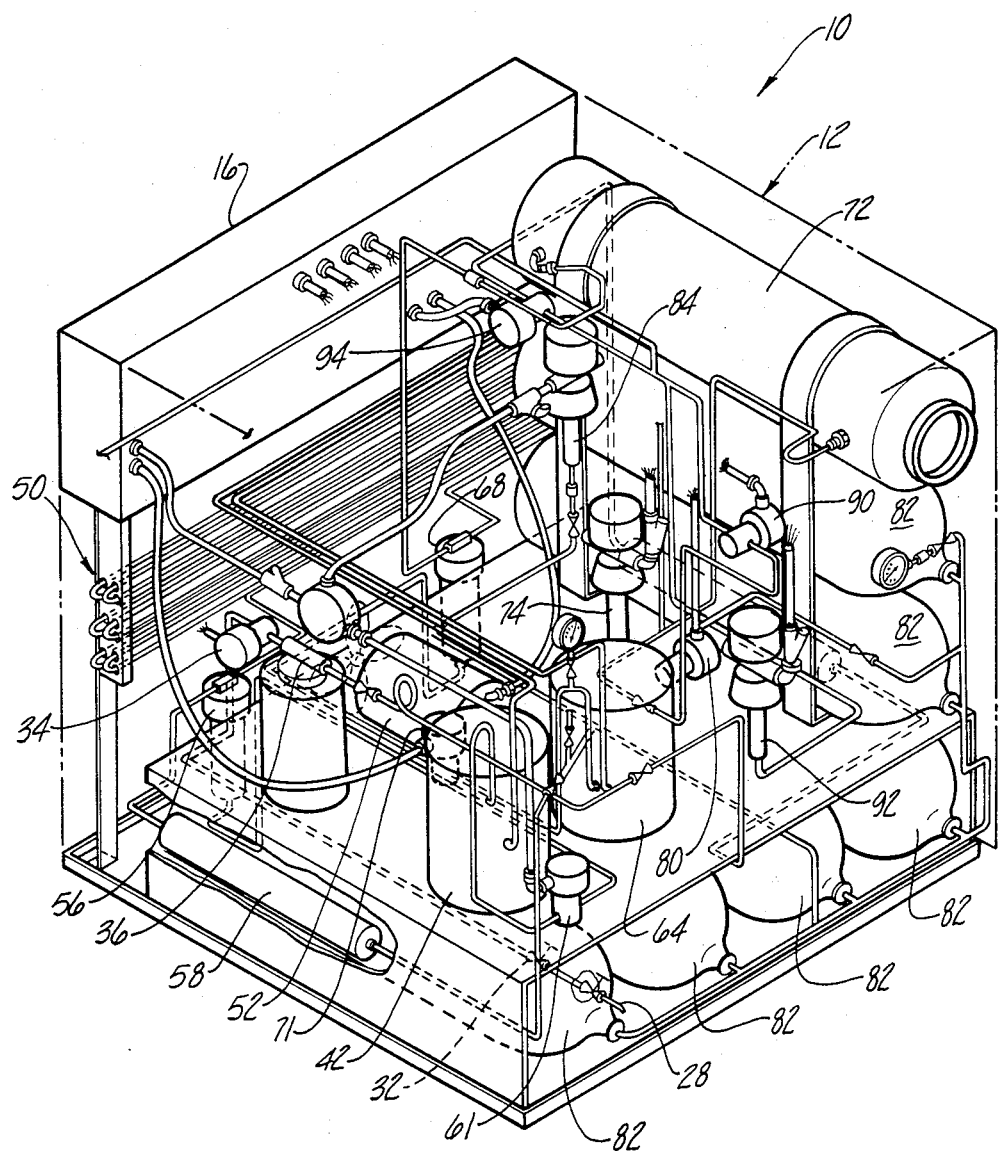
FIG. 2 is an enlarged perspective view of the refueling apparatus of FIG. 1, with its housing shown in phantom lines in order to reveal its internal components.
Figure 3:
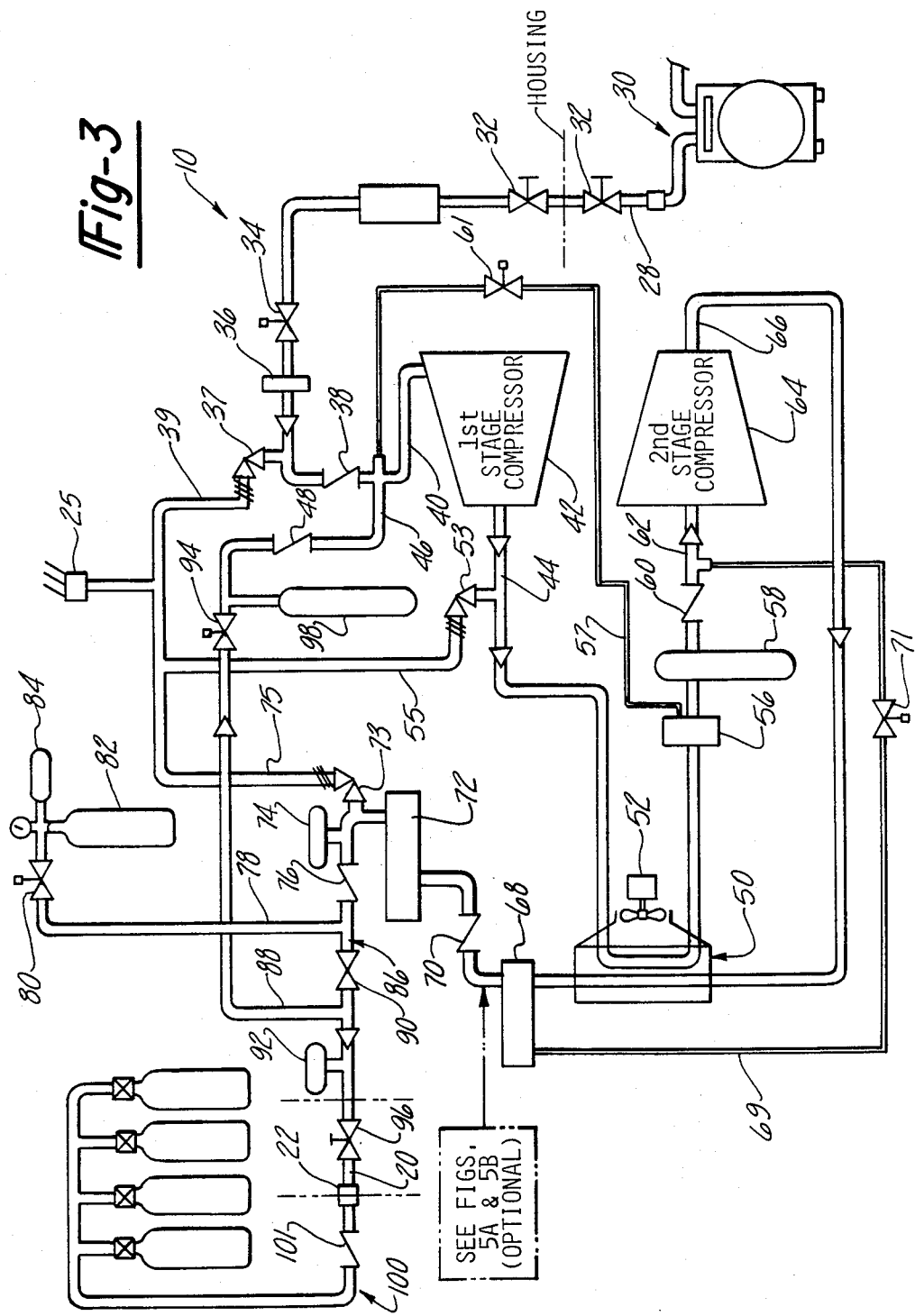
FIG. 3 is a schematic flow diagram of the exemplary refueling apparatus of FIG. 1.

Referring to FIGS. 2 and 3, the exemplary refueling module 10 is generally illustrated both in perspective and in schematic views. The refueling module 10 includes an inlet 28 adapted to be connected to a gaseous fuel supply system 30 by means of a conventional connector device of the type known to those skilled in the art. Preferably, the gaseous fuel supply system 30 comprises a natural gas supply system such as that commonly found in many residential and commercial facilities. The exemplary refueling module 10 also preferably includes a pair of manual shut-off valves 32 for shutting down the module during extended periods of non-use or for isolating the module from the supply system 30 for purposes of servicing or repairing the module.

The gaseous fuel from the supply system 30 is typically at ¼ psig (1.72 KPa) for example, and flows through a preferably electrically-operated solenoid valve 34, a desiccant filter apparatus 36, and a check valve 38, into the suction 40 of a first stage gas compressor 42. Although various types of desiccant filters may be employed for removing water vapor or other moisture from the incoming gaseous fuel, the desiccant filter 36 preferably employs a sorbent material, such as an activated carbon, a zeolite material, a silica gel-type material, or various clays, for example. The first stage gas compressor 42 compresses the gaseous fuel, and thereby increases its pressure to a predetermined desired pressure level. In one actually-constructed prototype embodiment of the present invention, such predetermined gas pressure at the discharge 44 of the first stage gas compressor 42 was generally in the range of 5 to 60 psig (34 to 414 KPa). The exact pressure in any particular application of the present invention will, of course, depend upon the pressure in the discharge line 44 and may vary in accordance with various operating conditions and design factors such as whether or not an additional compressor is included in the refueling module to futher compress the gaseous fuel, as well as other factors readily recognizable by those skilled in the art.

From the discharge 44 of the first stage gas compressor 42, the gaseous fuel flows through a gas cooler 50, which is preferably a cooling coil over which ambient air is forced by a cooling fan 52. In one actually-constructed prototype embodiment of the refueling module 10, the temperature of the gaseous fuel entering the gas cooler 50 was a maximum of approximately 240 F. (116 C.), and the gaseous fuel temperature on the outlet of the gas cooler 50 was substantially at ambient temperature. Although the gas cooler 50 has been depicted in the drawings as comprising the cooling coil apparatus described above, one skilled in the art will readily recognize that other types of heat exchanger apparatus or cooling means may alternately be employed to reduce the temperature of the compressed gaseous fuel from the discharge 44 of the first stage gas compressor 42.

From the gas cooler 50, the compressed gaseous fuel preferably flows through a lubricant filter and separator 56, an interstage accumulator or pulsation chamber 58, and a check valve 60, into the suction 62 of a second stage gas compressor 64, where it is further compressed to further increase its pressure to another predetermined pressure level. The lubricant filter and separator 56 may comprise any of a number of known filter-type devices adapted to remove lubricating oil or liquids from a gas stream passing therethrough. The lubricant filter and separator 56 functions to return compressor lubricants to the suction 40 of the first stage gas compressor 42 in a manner which will be described in detail below. The pulsation chamber 58 is an accumulator-type vessel, which serves to damp out any gas pressure surges or pulsations from the first stage compressor 42.

Unexpectedly, it was found that hermetically-sealed gas compressors of the type commonly employed in refrigeration apparatus were ideally suited for use as the first and second stage compressors described above. Such compressors are inexpensive, durable and readily available as off-the-shelf items. One skilled in the art will readily recognize, of course, that other compressors may alternatively be used.

The second stage gas compressor 64 further compresses the previously-compressed gaseous fuel to a pressure in a range of approximately 100 psig (689 KPa) to approximately 400 psig, such discharge pressure preferably being approximately 300 to 350 psig (2070 to 2415 KPa). The exact discharge pressure from the second stage gas compressor 64 will, of course, depend upon the pressure in the discharge line 66. One skilled in the art will, of course, readily recognize that either a single two-stage compressor, or even a single one-stage compressor, may be substituted for the two compressors 42 and 64 in order to compress the gaseous fuel to the desired pressures. Preferably in such case, the single two-stage compressor would include appropriate inlets and outlets for interstage connection of the gas cooler 50. Alternatively, if only a single, one-stage compressor is employed, the gas cooler 50 would be connected to the discharge side of such a compressor.

From the discharge 66 of the second stage gas compressor 64, the compressed gaseous fuel preferably flows back through the gas cooler 50, where it is again cooled from a maximum temperature of approximately 240 F. (116 C.) to substantially ambient temperature at the outlet of the gas cooler. The cooled and compressed gaseous fuel then flows through a second lubricant filter and separator 68, which is substantially similar to the previously-mentioned lubricant filter and separator 56, and which serves the same function of returning compressor lubricants to the suction 62 of the second stage gas compressor 64 as will be described in detail below.

Figure 5A:
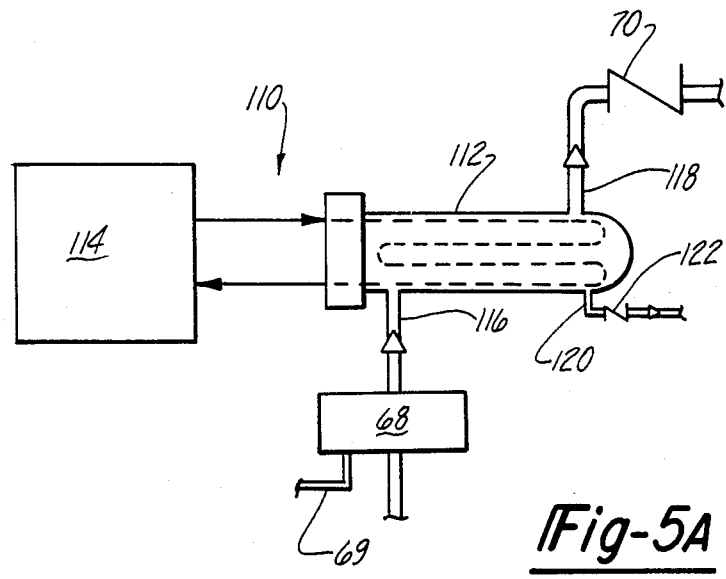
FIG. 5A is a schematic representation of a refrigeration system which may optionally be included in the apparatus in order to remove moisture from the gaseous fuel.
Figure 5B:
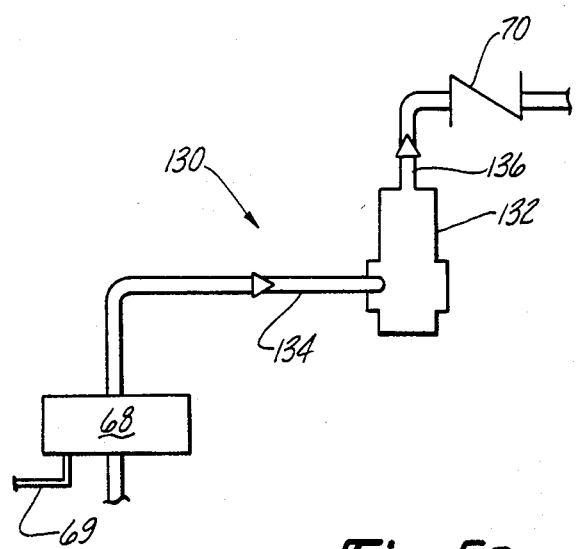
FIG. 5B is a schematic representation of still another optional moisture-removing system, comprising vortex-type refrigeration apparatus.

Since at ambient temperatures most gaseous fuels are capable of containing vaporized or entrained lubricants or moisture, an optional moisture-removing means may be included downstream of the lubricant filter and separator 68. The inclusion of such moisture-removing means is, of course, optional if desired or deemed necessary. Two of several alternate embodiments of the optional moisture-removing means are shown in FIGS. 5A and 5B, and will be described in detail below.

The previously cooled compressed gaseous fuel next preferably flows through a check valve 70 and into one or more adsorbent filters 72. The sorbent filter 72 preferably comprises a chamber containing a sorbent material, such as a zeolite, an activated carbon, a silica gel, or various clays, for example. The sorbent filter 72 preferably functions to remove any remaining compressor lubricants or other materials, and also to remove the so-called "heavy end" constituents of the gaseous fuel. Generally speaking, such heavy end constituents include propane and other constituents that are heavier than methane. The purpose of removing such heavy end constituents is to maximize the capability of the storage tanks on the vehicle (or other gaseous fuel consuming device) to sorptively store the constituents of the gaseous fuel for which the vehicle's engine or other fuel consuming device is designed.

From the sorbent filter 72, the compressed gaseous fuel flows through a check valve 76, and then flows into an inlet 78 for one or more optional, but preferred, sorbent storage vessels 82, or flows into the refueling module discharge system 86. The path of the fuel flow depends upon the function of a control system (described below) which automatically opens or closes various solenoid valves in response to various gas pressure conditions throughout the system. It should be noted that the sorbent storage vessels 82 are optional, but preferred. An even less expensive refueling apparatus according to the present invention may be provided that eliminates the sorbent storage tanks (and their associated controls and apparatus) altogether, or that includes storage tanks that do not contain a sorbent material therein.

If the outlet conduit 20 is disconnected from the vehicle or other gaseous fuel consuming device, and the gas pressure in the sorbent storage vessels 82 is below a predetermined pressure level, the compressed gaseous fuel will flow through the inlet 78 and a preferably electrically-operated solenoid valve 80 to recharge the sorbent storage vessels 82. Such recharging of the storage vessels 82 will also occur even if the outlet conduit 20 is still connected to the vehicle storage system 100 and the pressure in the vehicle storage vessels or tanks is generally at or above a desired pressure level, generally approximately 300 to 350 psig (2070 to 2415 KPa). Alternatively, if the pressure in the vehicle's storage tanks is below such desired pressure level, the control system (described below) will cause the compressed gaseous fuel to flow through a preferably electrically-operated solenoid valve 90 and into a manual discharge valve 96, which may be either in the outlet conduit 20 or incorporated into the connector device 22. Preferably, a check valve 101 is included in the vehicle storage system 100 to prevent the gaseous fuel from returning to the refueling apparatus.

Downstream of the solenoid valve 90, a vent line 88 is preferably provided for venting compressed gaseous fuel from the outlet conduit 20 when the connector 22 is disconnected from the vehicle or other gaseous fuel consuming device after the refueling operation is completed. As will be described in detail below, the preferred control system automatically causes a preferably electrically-operated solenoid valve 94 to open in order to allow such vented compressed gaseous fuel to be released into a holding chamber or vessel 98. Once the pressure in the outlet conduit 20 has been reduced to a sufficiently low level, the solenoid valve 94 closes, to isolate the holding chamber 98 between the solenoid valve and a check valve 48. Upon later actuation of the gas compressors, the gaseous fuel in the holding chamber 98 is caused to flow through the check valve 48 into the suction 40 of the first stage gas compressor 42. The above-described automatic venting system for the outlet conduit 20 is optional, but is preferably included in the refueling module system in order to relieve the pressure in the outlet conduit 20, thereby allowing for ease of disconnection of the connector 22. It should be noted, however, that the manual discharge valve 96 is preferably a three-way manually-operated valve which also allows the operator to manually vent the outlet conduit 20 directly to the atmosphere or to other gas collection or disposal means in order to allow for ease of disconnecting the connector 22.

The refueling module 10 also preferably includes a pressure relief valve 37, which is upstream of the check valve 38 and which opens in response to an unacceptably high gas pressure level and relieves such pressure by venting the gas to the atmosphere through an atmospheric vent 25. Similarly, a pressure relief valve 53 is provided on the discharge 44 of the first stage gas compressor 42, and a pressure relief valve 73 is provided at the outlet of the adsorbent filter 72. The pressure relief valves 53 and 73 are adapted to open in response to undesirably high gas pressures and to relieve such pressures by venting gaseous fuel through their respective vent lines 55 and 75 and the atmospheric vent 25.

The lubricant filter and separator 56 on the discharge side of the first stage gas compressor 42 is adapted to collect compressor lubricants from the compressed gaseous fuel and return them to the suction 40 of the first stage gas compressor 42 through a return line 57 and a preferably electrically-operated solenoid valve 61. Similarly, the lubricant filter and separator 68 is adapted to collect compressor lubricants and return them to the suction 62 of the second stage gas compressor 64 through a return line 69 and a preferably electrically-operated solenoid valve 71. Because of the well-known difficulty in starting or activating a gas compressor without first balancing the pressure between the suction and discharge sides of the compressor, the control system (described below) is also adapted to cause the solenoid valves 61 and 71 to remain closed whenever the first and second stage gas compressors 42 and 64 are activated, and further adapted to cause the solenoid valves 61 and 71 to open whenever the first and second stage gas compressors 42 and 64 are deactivated. Such opening of the solenoid valve 61 and 71 provides fluid communication between the suctions and discharges of their respective gas compressors in order to balance the gas pressures across the compressors, thereby allowing the compressors to restart upon reactivation thereof. Furthermore, the flow of gas between the suctions and discharges of the respective compressors, through their respective return lines 57 and 69, also provides sufficient motivating force and pressure to forcibly urge the collected lubricants from the separators 56 and 68 to the respective suctions 40 and 62 of the respective gas compressors 42 and 64.

Figure 4:
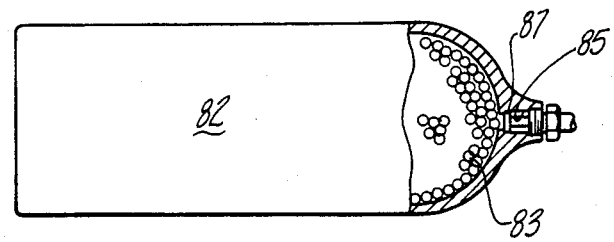
FIG. 4 illustrates one of the fuel storage or filter vessels of the exemplary refueling apparatus of FIG. 1, with a portion of the vessel's wall broken away to reveal its interior.

Referring to FIG. 4, an exemplary sorbent storage vessel 82 includes a sorbent material 83 that is contacted by the gaseous fuel flowing through the inlet 85. As referred to herein, the terms "sorbent" and "sorptive" are intended to refer to both adsorbing or absorbing, or both. Preferably, the inlet 85 of the sorbent storage vessel 82 includes an inlet filter 87, which may comprise a screen mesh-type filter, a fibrous-type filter, or other filter means known in the art that is suitable for substantially preventing the introduction of particles or other impurities into the sorbent material 83. The sorbent material 83 may comprise any of a number of sorbents, such as activated carbon, zeolite compounds, silica gels, or various clays, for example. Such sorbent materials may be in the form of pellets, spheres, granulated particles, or other suitable forms whereby the surface area of the sorbent material is optimized in order to maximize the amount of gaseous fuel adsorbed or absorbed (or both) thereby. The present invention also contemplates the use of liquid absorbents, such as a liquid coating on an adsorbent material, for example. The sorbent filter 72 includes a similar sorbent material and has a somewhat similar tank-like construction and configuration to that shown in FIG. 4 for the sorbent storage vessel 82, except that the filter 72 has separate inlets and outlets.

Although Columbia grade 9LXC activated carbon pellets were used as a sorbent material in one actually-constructed prototype embodiment of the exemplary refueling module 10, and is generally regarded to be the preferred sorbent material for the sorbent filter 72 and the sorbent storage vessels 82, other sorbent materials may be alternatively employed. Specific examples of such sorbent materials are listed below:

| ADSORBENT MATERIAL | MANUFACTURER | PRODUCT DESIGNATION |
|---|---|---|
| Activated Carbon | Calgon Corp. | BPL 4 × 10 Mesh Coal Base |
| Activated Carbon | Calgon Corp. | PCB 4 × 10 Mesh Coconut Base |
| Activated Carbon | American Norit Company, Inc. | Sorbonorit B4 Pellets |
| Activated Carbon | Westvaco Chemical Company | Nuchar S-A |
| Activated Carbon | Westvaco Chemical Company | Nuchar WV-A 14 × 35 Wood Base Granular |
| Activated Carbon | Witco Chemical Division | Columbia Grade 9LXC Powder Low Ash Coal Base |
| Activated Carbon | Witco Chemical Division | Columbia Grade 9LXC Pellet Low Ash Coal Base |
| Activated Carbon | American Norit Company | Norit RB-3 |
| Zeolite (Natural) | Anaconda Minerals Company | 2020A/D1 |
| Zeolite (Synthetic) | Union Carbide Corp. Linde Division | Metal Alumino Silicate 13X 8 × 12 Beads |
| Zeolite (Synthetic) | Union Carbide Corp. Linde Division | Metal Alumino Silicate 4A 8 × 12 Beads |
| Zeolite (Synthetic) | Union Carbide Corp. Linde Division | Metal Alumino Silicate 5A ⅛" Pellets |
| Zeolite (Synthetic) | Union Carbide Corp. Linde Division | Metal Alumino Silicate 13X Powder |
| Zeolite (Natural) | Anaconda Minerals Company | 5050 L |
| Zeolite (Natural) | Double Eagle | Clinoptilolite |

| ADSORBENT MATERIAL | MANUFACTURER | PRODUCT DESIGNATION |
|---|---|---|
| | Petroleum and Mining Company | |
| Silica Gel | — | — |
| Clay | — | — |

It should be noted that it has been found advantageous to activate the preferred carbon sorbent material before putting the refueling module 10 into use. Specifically, the sorbent material is first packed into the sorbent filter 72 and the sorbent storage vessels 82 to the maximum extent possible, and each filter or storage vessel is evacuated. Then each of the filter or storage vessels is placed in an oven otherwise heated and then again evacuated.

As mentioned above, most gaseous fuels are capable of containing vaporized or other entrained lubricants or liquid materials even at ambient temperatures. Therefore, if found to be necessary or desired, an optional moisture-removing means may be included downstream of the lubricant filter and separator 68. One of several alternate embodiments of such optional moisture-removing means is illustrated schematically in FIG. 5A. An exemplary moisture removal system 110 generally includes a heat exchanger 112 operatively connected to a conventional refrigeration system 114 and adapted for cooling the gaseous fuel in order to cause vaporized or entrained lubricants or other liquids to be precipitated out from the gaseous fuel stream. The heat exchanger 112 includes a gas inlet 116 and a gas outlet 118, with refrigerant from the refrigeration system 114 being conveyed therethrough. The refrigerant from the refrigeration system 114 and the gaseous fuel are isolated from one another in the shell-and-tube heat exchanger 112 (or other suitable heat transfer device). As the gaseous fuel is cooled, the lubricants or other liquids are precipitated out and conveyed from the heat exchanger 112 through a drain line 120 and a check valve 122, and are then either returned to the suction side of one of the gas compressors or otherwise conveyed to a suitable disposal means.

Another alternate embodiment of the optional moisture-removing means is shown schematically in FIG. 5B. An examplary alternate moisture removal system 130 generally includes a vortex apparatus 132 having a gas inlet 134 and a gas outlet 136. Devices such as the vortex apparatus 132 are well-known in the art and are adapted to impart a vortex or otherwise generally spinning flow path to the compressed gaseous fuel flowing therethrough, thereby cooling the fuel so that lubricants or other entrained liquids may be separated out. An example of such a vortex separator is the so-called "Vortex Tube", manufactured and sold by Vortec Corporation of Cincinnati, Ohio.

The inclusion of one of the moisture removal systems 110 or 130, or other suitable moisture removal apparatus is optional in the refueling module 10, but may be deemed desirable or necessary in order to reduce contamination of the sorbent filter 72, thereby prolonging the useful life of the sorbent material therein.

The operation of the exemplary refueling module 10 may best be described with reference to the schematic flow diagram of FIG. 3. In order to discharge gaseous fuel from the refueling module 10 into the vehicle storage system 100, the outlet conduit 20 is connected to the vehicle storage system by way of the connector device 22, the manual discharge valve 96 is opened, and the refueling module is energized (as described below). When the refueling module 10 is energized, the solenoid valves 80 and 90 are caused to open and the solenoid valve 94 is caused to close. The pressurized gaseous fuel in the sorbent storage vessels 82 is thereby discharged through the outlet conduit 10 to the vehicle storage system 100. Simultaneously, a timer device (described below) starts and runs for a predetermined period of time. At the end of such time, the pressure in the storage vessels 82 and the vehicle storage system 100 are approximately equalized, and the solenoid valve 80 is caused to close, the compressors 42 and 64 are started, the cooling fan 52 is started, the solenoid valve 34 is opened, and the solenoid valves 61, 71 and 94 are closed.

The compressors 42 and 64, and the cooling fan 52, continue to run until the pressure in the vehicle storage system 100 is pressurized to a predetermined pressure level. When the predetermined pressure level in the vehicle storage system is reached, the pressure switch 92 causes the solenoid valve 90 to close and the solenoid valve 80 to open, thereby allowing the storage vessels 82 to be recharged and pressurized to their predetermined pressure level.

It should be noted that the control system preferably prioritizes the functions of the refueling module such that if the storage vessels 82 are charged to their predetermined levels, the vehicle storage system 100 receives gaseous fuel from the storage vessels first and then from the gas compressors 42 and 64. If the storage vessels 82 are not so pressurized when the refueling module is connected to the vehicle storage system, the gaseous fuel bypasses the storage vessels to first supply the vehicle storage system before recharging the storage vessels.

When the desired pressure in the storage vessels 82 is reached, the pressure switch 84 causes the solenoid valves 34 and 80 to close and causes the compressors 42 and 64 and the cooling fan 52 to be deactivated. Simultaneously, the pressure switch 84 causes the solenoid valves 61 and 71 to open in order to balance the gaseous fuel pressure on the suction and discharge sides of their respective gas compressors. As discussed above, compressed gaseous fuel flows from the discharge side to the suction side of the first stage gas compressor 42 and simultaneously forcibly urges collected compressor lubricants in the lubricant filter and separator 56 through the return line 57 and into the suction 40 of the first stage gas compressor. Similarly, when the solenoid valve 71 is opened, collected compressor lubricants are forced from the lubricant filter and separator 68 through the return line 69 and into the suction 62 of the second stage gas compressor 64. When the refueling apparatus shuts off, the pressure switch 92 causes the solenoid valve 94 to open in order to vent the gaseous fuel from the outlet conduit 20 to the holding chamber 98, thereby allowing the outlet conduit to be easily disconnected.

The pressure switch 74 may optionally be included and set at a pressure level slightly higher than that of the pressure switches 92 and 84. Thus the pressure switch 74 may function as part of a safety shut-off system that automatically shuts down the entire refueling module system in the event of an unacceptably high gas pressure level therein. As a further safety feature, the pressure relief valves 37, 53 and 73 may be set at a pressure slightly higher than that of the optional pressure switch 73 (if included) and serve to automatically relieve the pressure in the system if the pressure continues to build even after the system is shut down.

FIG. 6 illustrates an exemplary electrical control system adapted to cause the refueling module to function as described above. One skilled in the art will readily recognize, of course, that other control systems, either electrical or of other types, may alternatively be employed. In order to initiate operation of the exemplary refueling module 10, an on-off breaker switch 154 is closed. The closing of the on-off switch 154 causes the preferably red indicator lamp R to illuminate, indicating that the gas compressors are not activated, and further causes the preferably green indicator lamp G to illuminate, indicating that the sorbent storage vessels 82 are charged and pressurized to their predetermined level.

In order to discharge gaseous fuel from the refueling module 10 into the vehicle storage system 100, the outlet conduit 20 is connected to the vehicle storage system by way of connector 22, the manual discharge valve 96 is opened, and the vehicle fill switch 156 is closed and held closed by the operator until the indicator lamp G shuts off. The closing of the vehicle fill switch 156 completes a circuit to cause the relay R1 to be energized, which closes the contacts R1a and R1b and opens the contacts R1c, thereby causing the solenoid valves 90 and 80 to open, the solenoid valve 94 to close, and the timer T1 to start. The compressed gaseous fuel in the sorbent storage vessels 82 is thus allowed to discharge through the outlet conduit 20 into the vehicle storage system 100. The decrease in the pressure of the sorbent storage vessels 82 initially causes the pressure switch 84 to close, thereby shutting off the indicator lamp G and energizing the relay R2 in order to close its contacts R2a, R2b and R2c. At this time, the vehicle switch 156 may be released to its open position because both of the contacts R1a and R2a are closed.

After a predetermined time established by the timer T1, the pressures in the storage vessels 82 and in the vehicle storage system 100 are approximately equalized, and the timer T1 causes its contacts T1a to close and T1b to open, thereby energizing the compressor relay C and closing the solenoid valve 80 to isolate the storage vessels 82. The relay C closes its contacts Ca and Cb, causing the compressors 42 and 64, as well as the cooling fan 52 to start. At the same time, the preferably amber indicator lamp A is illuminated (to indicate that the compressors and fan are running), and the relay R5 is energized. The energized relay R5 opens the contacts R5a and thus shuts off the indicator lamp R.

The compressors 42 and 64 continue to run until the pressure in the vehicle storage system is pressurized to a predetermined pressure level, causing the pressure switch 92 to open and thereby closing the solenoid valve 90. The opening of the pressure switch 92 also energizes the relay R4, which causes its contacts R4a and R4b to close and R4c to open.

Once the storage tank 82 has been recharged to its predetermined pressure, the pressure switch 84 again opens to de-energize the relay R2 and illuminate the indicator lamp G. The de-energization of the relay R2 opens the contacts R2a and R2b, thereby de-energizing the relay R1, and opens the contacts R2b. The de-energization of the relay R1 in turn opens the contacts R1a and R1b to reset the system and to de-energize the timer T1 and close the solenoid valve 80. As a result, the contacts T1a simultaneously open to de-energize the relay C (and thus deactivate the compressors and cooling fan) and to open the normally open solenoid valves 61 and 71 in order to balance the pressures across the compressors and force the compressor lubricants back to the suction thereof. Also, the solenoid valve 94 is caused to open to vent the gaseous fuel from the outlet conduit 20 into the holding chamber 98.

It should be noted that if for any reason the power is interrupted during the refueling operation, the vehicle fill switch 156 must be pushed again in order to resume refueling. Also, if for any reason, the system becomes overpressurized, the optional pressure switch 73 automatically shuts down the system as discussed above.

On some occasions, the refueling operation may be interrupted or terminated before the pressure in the vehicle storage system 100 reaches the predetermined pressure that opens the pressure switch 92, thereby preventing the storage tanks 82 from being recharged. One example of such an occasion is when the vehicle is needed by the user before the refueling operation is completed. In such a case, the control system provides for recharging or refilling the storage tanks 82 other than as described above at the completion of a full refueling operation.

To recharge the storage vessels, operation of the refueling module is initiated by closing the on-off breaker switch 154 as described above, thereby illuminating the indicator lamp R and energizing the relay R2 through the closed pressure switch 84. As a result the contacts R2a, R2b, R2c are closed. The optional storage tank fill switch 160 is depressed to energize the relay R3, thus closing the contacts R3a, R3c and R3d, and opening the contacts R3b. This allows the optional switch 160 to be released to its open position, causes the solenoid valve 80 to open, and starts the compressors and cooling fan by way of the relay C and its contacts Ca. Simultaneously, because contacts Cb are closed and the relay R5 is energized to open the contacts R5a, the lamp A is illuminated and the lamp R is shut off. The compressors and cooling fan then continue to run until the pressure in the storage tanks 82 reaches their predetermined level and the system is automatically shut down by the opening of the pressure switch 84 and the remainder of the sequence described above. It should be noted that if power is interrupted during the recharging of the storage tanks 82, the compressors and fan will be deactivated and thus the solenoid valve 80 will close. To resume the operation, the optional switch 160 must again be depressed. It should be noted that the switch 160 is optional, and if included, it functions as described above. Finally, it should also be noted that a stop switch 170 is provided to allow the operator to shut down the system manually if desired or necessary to do so.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. An apparatus for supplying low-pressure gaseous fuel to a gaseous fuel consuming device, said apparatus comprising:
    inlet means adapted to be connected in fluid communication with a source of gaseous fuel;
    compression means for compressing said gaseous fuel in order to increase its pressure to a first predetermined pressure level less than approximately 500 psig (3450 kPa), said compression means having an intake in fluid communication with said inlet means and a compression discharge outlet for discharging compressed gaseous fuel from said compression means;
    cooling means for reducing the temperature of said compressed gaseous fuel;
    storage means for storing a predetermined quantity of said compression gaseous fuel, conveying means for conveying said compressed gaseous fuel to said storage means, said storage means including a sorbent material for sorptive storage of said predetermined quantity of said compressed gaseous fuel;
    an apparatus discharge means adapted to be selectively and releasably connected to said gaseous fuel consuming device for selectively supplying said compressed gaseous fuel thereto; and
    control means for selectively supplying said compressed gaseous fuel to said gaseous fuel consuming device from either said compressor means or said storage means, said control means causing said compressed gaseous fuel to be supplied to said gaseous fuel consuming device from said storage means when the pressure therein is generally at or above a second predetermined pressure level and further causing said storage means to be bypassed by said compressed gaseous fuel when said storage means pressure drops below a third predetermined level, said control means further causing said compressed gaseous fuel to be supplied to said storage means after said apparatus discharge means has been selectively disconnected from said gaseous fuel consuming device or alternatively after the pressure of the compressed gaseous fuel in said gaseous fuel consuming device has increased to a fourth predetermined pressure level, said compressed gaseous fuel being supplied to said storage means until the pressure in said storage means is generally at said second predetermined pressure level.

2. An apparatus according to claim 1, further comprising means for removing moisture from said gaseous fuel before it is supplied to said device or stored by said storage means.

3. An apparatus according to claim 2, wherein said moisture removing means includes desiccant filter means between said inlet means and said compression means.

4. An apparatus according to claim 3, wherein said moisture removing means further includes moisture separating means between said cooling means and both said storage means and said discharge means.

5. An apparatus according to claim 1, wherein the maximum pressure of said compressed gaseous fuel supplied to said device is in the range of approximately 200 psig (1380 kPa) to approximately 400 psig (2760 kPa).

6. An apparatus according to claim 1, wherein said compression means comprises at least one hermeticaly-sealed gas compressor.

7. An apparatus according to claim 1, further comprising sorbent filter means for sorptively removing generally all materials from said gaseous fuel except for certain preselected constituents of said gaseous fuel therefrom before said gaseous fuel is supplied to said device or stored by said storage means.

8. An apparatus according to claim 1, wherein said apparatus discharge means includes a fluid conduit adapted to be selectively and releasably connected to said gaseous fuel consuming device for supplying said compressed gaseous fuel thereto, said control means further including means for discontinuing said supply when the gaseous fuel pressure in said gaseous fuel consuming device is generally at or above said fourth predetermined pressure level and for venting said compressed gaseous fuel from said fluid conduit after said supply has been discontinued.

9. An apparatus according to claim 1, further including means for deactivating said compressor means after the gaseous fuel pressure in said storage means is generally at or above said second predetermined pressure level, and means for equalizing the gaseous fuel pressure between the intake and the compressor means outlet of said compressor means after said compressor means has been deactivated.

10. An apparatus according to claim 1, further including accumulator means in fluid communication with the compressor means outlet for damping any surges in the pressure of said compressed gaseous fuel therefrom.

11. A refueling apparatus for a vehicle or other device fueled by a gaseous hydrocarbon fuel, said refueling apparatus comprising:
    inlet means adapted to be connected in fluid communication with a source of said gaseous fuel;
    hermetically-sealed compressor means for compressing said gaseous fuel in order to increase the pressure thereof up to a first predetermined pressure level;
    air cooling means for decreasing the temperature of said compressed gaseous fuel;
    said compressor means including first stage compressor means for initially increasing the pressure of said gaseous fuel and second stage compressor means for further increasing the pressure of said compressed gaseous fuel from said first stage compressor means, said air cooling means including an interstage heat exchanger adapted to decrease the temperature of said compressed gaseous fuel from said first stage compressor means before it is further compressed in said second stage compressor means;
    sorbent filter means for sorptively removing generally all materials from said gaseous fuel except for certain preselected constituents of said gaseous fuel therefrom;
    discharge means for supplying said compressed gaseous fuel from said second stage compressor means to said vehicle or other gaseous fueled device, said discharge means including a discharge fluid conduit selectively and releasably connectable to a fuel inlet means on said vehicle or device in order to selectively refuel the same;
    at least one storage vessel, said storage vessel containing an adsorptive material therein and being adapted for adsorptive storage of a predetermined quantity of said compressed gaseous fuel from said second stage compressor means;

control means for supplying said compressed gaseous fuel to said vehicle or device from either said second stage compressor means or said storage vessel, said control means causing said compressed gaseous fuel to be initially supplied to said vehicle or device from said storage vessel when the initial pressure therein is generally at or above a second predetermined pressure level and further being adapted to cause said storage vessel to be bypassed in order to supply said compressed gaseous fuel to said vehicle or device from said second stage compressor means when said storage tank pressure drops below a third predetermined level, said control means automatically supplying said compressed gaseous fuel to said storage vessel after said fluid conduit has been disconnected from said vehicle or device or alternatively after the gaseous fuel pressure in said vehicle or the like has increased generally to a fourth predetermined pressure level, said control means further being adapted to deactivate said compressor after the gaseous fuel pressure in said storage vessel has increased generally to said second predetermined level; and lubricant filter means on the outlet of each of said first and second stage compressor means for substantially trapping and collecting any compressor means lubricants from said compressed gaseous fuel, fluid conduit means connecting each said lubricant filter means with the suction of its respective first or second stage compressor means, each said fluid conduit means including valve means therein, and said control means maintaining each said valve means in its closed condition when its respective first or second stage compressor means is activated and opening each said valve means when its respective first or second stage compressor means is deactivated to cause a quantity of compressed gaseous fuel to flow from said respective compressor means outlet to said respective compressor means suction in order to substantially balance the pressure therebetween and to forcibly return said collected lubricants to the respective compressor means suction.

12. A refueling apparatus according to claim 11, wherein said predetermined maximum pressure level is in the range of approximately 100 psig, (689 kPa) to approximately 500 psig (3450 kPa).

13. A refueling module according to claim 11, wherein said first stage and second stage compression means each comprise a separate hermetically-sealed refrigerant-type gas compressor.

14. A refueling apparatus according to claim 11, wherein said compressor means comprises a hermetically-sealed two-stage compressor, said two-stage compressor being adapted for fluid connection of said interstage heat exchanger between stages.

15. A refueling apparatus according to claim 11, comprising moisture separating means between said air cooling means and said sorbent filter means.

16. A refueling apparatus according to claim 15, wherein said moisture removal means comprises means for further cooling said compressed gaseous fuel below ambient air temperature in order to separate moisture therefrom, and drain means for removing said separated moisture from said refrigeration means.

17. A refueling apparatus according to claim 15, wherein said moisture removal means comprises a vortex tube device.

18. A natural gas refueling module for refueling a natural gas powered vehicle or other device using natural gas, said refueling module comprising:

an inlet adapted to be connected to a natural gas supply system;

at least one hermetically-sealed gas compressor means on said refueling module having its suction connected to said inlet for compressing said natural gas to increase the pressure thereof up to a first predetermined pressure level less than approximately 400 psig (2760 kPa)

air cooling means on said refueling module for decreasing the temperature of said compressed gaseous natural gas;

said hermetically-sealed compressor means including first stage compression means for initially increasing the pressure of said gaseous natural gas and second stage compression means for further increasing the pressure of said compressed gaseous natural gas from said first stage compression means, said air cooling means including an interstage heat exchanger adapted to decrease the temperature of said compressed gaseous natural gas from said first stage compression means before it is further compressed in said second stage compression means, said air cooling means including a secondary heat exchanger adapted to decrease the temperature of said compressed gaseous natural gas from said second stage compression means;

an adsorbent filter chamber having an adsorbent material therein adapted for adsorbing heavy-end constituents from said compressed natural gas from said second stage compression means;

at least one adsorbent storage vessel for adsorptively storing said compressed natural gas from said adsorbent filter generally at said first predetermined pressure level;

module outlet means for selectively supplying said compressed natural gas from said second stage compression means to said vehicle, said module outlet means including a fluid outlet conduit selectively and releasably connected to a fuel inlet means of said vehicle; and refueling module control means for supplying said filtered and compressed gaseous natural gas to said vehicle from either said second stage compression means or said storage vessel, said control means causing said filtered and compressed gaseous natural gas to be supplied to said vehicle from said storage vessel when the pressure therein is generally at or above a second predetermined pressure level and further causing said storage vessel to be bypassed by said filter and compressed gaseous natural gas when said refueling apparatus storage vessel pressure drops below a third predetermined level; said refueling module control means further causing said compressed gaseous natural gas to be supplied to said storage vessel after said discharge fluid conduit has been selectively disconnected from said vehicle fuel inlet means or alternatively after the pressure of the compressed gaseous natural gas in said vehicle has increased to a fourth predetermined pressure level, said compressed gaseous natural gas being supplied to said refueling apparatus storage vessel until the pressure in said refueling apparatus storage vessel is generally at said second predetermined pressure level; said control means further deactivating said compressor after the compressed gaseous natural gas pressure in said refueling apparatus storage vessel has increased generally to said second predetermined pressure level; and lubricant filter means on the discharge of each of said first and second stage compression means for substantially trapping and collecting any compression means lubricants from said compressed gaseous fuel therefrom, fluid conduit means separately connecting each of said lubricant filter means with the suction of its associated compression means, each said conduit means including valve means therein, and said control means including means for maintaining each said valve means in its closed condition when its associated compression means is activated and for opening each said valve means when its associated compression means is deactivated to cause compressed gaseous fuel to flow from said discharge to said suction of its associated compression means in order to substantially balance the pressure therebetween and to forcibly return said collected lubricants to the suction of its associated compression means.

19. A natural gas refueling module according to claim 18, further comprising check valve means in said inlet for substantially preventing backflow of natural gas into said natural gas supply system, and normally-closed valve means for substantially isolating the remainder of said module from said natural gas supply system when said module is deactivated.

20. A natural gas refueling module according to claim 18, further comprising first means for removing moisture from the natural gas from said inlet prior to admitting said natural gas to said compressor means and second means for removing moisture from said compressed natural gas prior to admitting said compressed natural gas to said adsorbent filter chamber.

21. A natural gas refueling module according to claim 20, wherein said first moisture removal means comprises a desiccant filter device having an adsorbent material therein for adsorbing said moisture from said natural gas.

22. A natural gas refueling module according to claim 20, wherein said second moisture removal means comprises refrigeration means for cooling said compressed natural gas below ambient temperature in order to separate said moisture therefrom, and drain means for removing said separated moisture from said refrigeration means.

23. A natural gas refueling module according to claim 20, wherein said second moisture removal means comprises a vortex tube device.

* * * * *

UNITED STATES PATENT AND TRADEMARK OFFICE
CERTIFICATE OF CORRECTION

PATENT NO. : 4,531,558

DATED : July 30, 1985

INVENTOR(S) : Larry J. Engel et al

Page 1 of 2

It is certified that error appears in the above-identified patent and that said Letters Patent is hereby corrected as shown below:

On the title page under references cited;
"4,187,882" should be --4,178,882--

Column 1, line 23-24
"alternative" should be --alternatives--

Column 1, line 54
"(1380 KPa)" should be --(1380 kPa)--

Column 2, line 55
After "psig" (first occurrence) insert --(1380 kPa)--

Column 2, line 55
After "psig" (second occurrence), "(1380 KPa)" should be --(2760 kPa)--

Column 4, line 26
"(1.72 KPa)" should be --(1.72 kPa)--

Column 4, line 42
"(34 to 4.14 KPa)" should be --(34 to 4.14 kPa)--

Column 5, line 24
"(689 KPa)" should be --(689 kPa)--

Column 5, line 25
After "psig" insert --(2760 kPa)--

Column 5, line 26-27
"(2070 to 2415 KPa)" should be --(2070 to 2415 kPa)--

UNITED STATES PATENT AND TRADEMARK OFFICE
CERTIFICATE OF CORRECTION

PATENT NO. : 4,531,558

DATED : July 30, 1985

INVENTOR(S) : Larry J. Engel et al

It is certified that error appears in the above-identified patent and that said Letters Patent is hereby corrected as shown below:

Column 6, line 37
  "(2070 to 2415 KPa)" should be --(2070 to 2415 kPa)--

Column 14, line 2-3
  "hermeticaly-sealed" should be --hermetically-sealed--

Signed and Sealed this

Twenty-eighth Day of January 1986

[SEAL]

Attest:

DONALD J. QUIGG

Attesting Officer

Commissioner of Patents and Trademarks